US006586492B1

(12) United States Patent
Caiger et al.

(10) Patent No.: US 6,586,492 B1
(45) Date of Patent: Jul. 1, 2003

(54) RADIATION-CURABLE INK-JET INK VEHICLE

(75) Inventors: Nigel Antony Caiger, Somerset (GB); Hartley David Selman, Bristol (GB)

(73) Assignee: Coates Brothers PLC, Kent (GB)

( * ) Notice: Subject to any disclaimer, the term of this patent is extended or adjusted under 35 U.S.C. 154(b) by 0 days.

(21) Appl. No.: 09/674,044

(22) PCT Filed: Apr. 21, 1999

(86) PCT No.: PCT/GB99/01217
§ 371 (c)(1),
(2), (4) Date: Feb. 26, 2001

(87) PCT Pub. No.: WO99/54416
PCT Pub. Date: Oct. 28, 1999

(30) Foreign Application Priority Data

Apr. 21, 1998 (GB) ............................................. 9808480

(51) Int. Cl.$^7$ ............................................. C09D 11/00
(52) U.S. Cl. ........................... 522/75; 522/81; 522/83; 522/120; 522/121; 522/129; 522/141; 522/142; 522/146; 522/170; 522/182; 522/183
(58) Field of Search ................. 522/75, 81, 83, 522/96, 103, 107, 182, 121, 120, 129, 141, 142, 146, 170, 183; 347/1; 106/31.13

(56) References Cited

U.S. PATENT DOCUMENTS

| 5,151,120 | A | * | 9/1992 | You et al. ................. 106/31.29 |
| 5,259,874 | A | * | 11/1993 | Miller et al. ............. 106/31.61 |
| 5,621,022 | A | * | 4/1997 | Jaeger et al. ................ 523/161 |
| 5,952,401 | A | * | 9/1999 | Kimura et al. ................. 522/85 |
| 5,959,020 | A | * | 9/1999 | Oliveri et al. ................. 522/63 |
| 6,310,115 | B1 | * | 10/2001 | Vanmaele et al. ............. 522/25 |

FOREIGN PATENT DOCUMENTS

| EP | 0 337 705 | * | 10/1989 |
| JP | 6200204 | * | 7/1994 |
| WO | WO 96/28305 | * | 9/1996 |

* cited by examiner

Primary Examiner—Susan W. Berman
(74) Attorney, Agent, or Firm—Levisohn, Lerner, Berger & Langsam, LLP

(57) ABSTRACT

An ink-jet ink is provided including an ink jet vehicle and a colorant. The vehicle includes at least 35% by weight radiation curable material, based on the total vehicle weight. The vehicle may but does not necessarily include a thickener. The vehicle is a paste or a solid at 20° C. and has a viscosity of less than 25 centipoise between 40° C. and 130° C.

37 Claims, No Drawings

RADIATION-CURABLE INK-JET INK VEHICLE

The present invention relates to radiation curable compositions suitable for use in the field of hot melt ink-jet printing and other applications.

Hot melt inks for use in ink-jet printing are compositions in which a dye or pigment is admixed with a vehicle which is essentially solid at room temperature but liquid at an elevated temperature at which print heads operate. The main advantage of hot melt inks over ink-jet inks which are liquids at room temperature, is that they solidify rapidly upon contact with the substrate. They are solid at room temperature and thus give a print quality which is essentially independent of the nature of the substrate. Moreover, independent temperature control of the substrate allows control of droplet spreading, again essentially independent of the properties of the substrate. This enables a superior print quality to be achieved than is obtainable with the liquid inks.

Current hot melt inks rely on solidification upon cooling to provide integrity of the print. Therefore, the durability of prints produced by the conventional kind of hot melt system is less than would be optionally desired in some applications.

Hot melt ink-like compositions are also used for modelling prototypes of articles of manufacture. A three-dimensional design produced on a computer aided design (CAD) system is used to control a hot-melt system which is used to "print" a hot melt composition in layers to build-up the complete prototype. The compositions used for this application need to be very hard at room temperature.

On the other hand, radiation-curable ink-jet inks are free-flowing liquids at room temperature. They spread rapidly on contact with the substrate until radiation curing causes "setting" of the ink droplets. As mentioned above, the print quality with such inks is substrate dependent. It is difficult to control the degree of droplet spread and prevent inter-droplet smear.

JP 06200204 discloses a radiation curable ink for an ink jet printer which is solid at room temperature. It comprises from 10% to 30% by weight of a radiation-curable prepolymer and monomer and from 70% to 90% by weight of a wax and resin thickener.

New forms of hot melt ink formulation have now been devised which achieve benefits over both hot melt ink-type compositions and radiation curable ink-jet compositions.

Thus, in a first aspect, the present invention now provides a vehicle for a hot melt ink-jet ink, the vehicle comprising at least 30% by weight of a radiation curable material and a thickener, said vehicle being a thixotropic paste at 20° C., preferably also at 25° C. and having a viscosity of less than 25 centipoise, preferably 12 centipoise at least one temperature in the range of from 40° C. to 130° C.

Vehicles according to the first aspect of the present invention are superior to those of JP 06200204 in that they have better flow properties within the printer apparatus and also have better curing properties.

However, a second aspect of the present invention provides a vehicle for a hot melt ink-jet ink, the vehicle comprising a radiation curable material, which curable material is a paste or solid at 20° C., preferably also at 25° C., the vehicle having a viscosity of less than 25 centipoise, preferably 12 centipoise at least one temperature in the range from 40° C. to 130° C.

Vehicles according to the second aspect of the present invention obviate the need for a separate thickener and in many embodiments, offer one or more other benefits in comparison with those materials disclosed in JP 06200204.

Those vehicles according to the second aspect of the present invention are solids (including waxy solids) and are analogues of conventional hot-melt compositions, except that they are radiation curable. Therefore, they exhibit higher durability than the former. Moreover, if they are printed onto a substrate supported on a heated plattern, the viscosity of the printed droplets can be reduced to a desired degree prior to cooling, to optimise print quality.

Vehicles according to the first aspect of the present invention (and those according to the second aspect of the present invention which are pastes at room temperature) may be characterised by their viscosity at 20° C., preferably 25° C.

Vehicles according to either aspect of the present invention which are pastes preferably have a viscosity of at least 500 centipoise (at a shear rate of 20 s$^{-1}$) at 20° C., preferably also at 25° C. The latter limit distinguishes the compositions from radiation-curable ink-jet compositions which are low viscosity liquids at room temperature. However, more preferably at 20° C. (preferably also 25° C.), vehicles according to the present invention have a viscosity of at least 800 centipoise, more preferably at least 1000 centipoise.

Vehicles according to the first aspect of the present invention are thixotropic pastes. Those according to the second aspect of the present invention are optionally pastes, in which case, they may or may not be thixotropic.

As used herein, any reference to a thixotropic (i.e. non-Newtonian) paste means that at a temperature of 20° C. (preferably also at 25° C.) and a shear rate of 20s$^{-1}$, their viscosity is at least 500 centipoise (preferably at least 800 centipoise, more preferably at least 1000 centipoise) and at the same temperature at a shear rate of 1,000 s$^{-1}$, their viscosity is no more than 300 centipoise (preferably no more than 200 centipoise, more preferably no more than 150) centipoise. Moreover, after application of shear at a shear rate of 1,000 s$^1$ centipoise for 60 seconds, the recovery time for recovery of the viscosity at 20s$^{-1}$ to return to the same value or higher as originally measured at that shear rate is no more than 60 seconds, preferably no more than 5 seconds.

The compositions according to either aspect of the present invention need to be liquid and jettable (i.e. having a viscosity of less than 25 centipoise, preferably 12 centipoise), at the print head temperature, i e. somewhere in the range of from 40° C. to 130° C.

Any vehicle according to either aspect of the present invention may consist of a single radiation-curable material, or a combination of materials, any or all of which is radiation-curable.

Vehicles according to the first aspect of the invention must include a thickener. Preferably the thickener used according to the first aspect of the invention is not radiation curable. In the case of the second aspect of the present invention, the radiation curable material is sufficiently viscous to endow the vehicle with the necessary solidity or paste-like viscosity at 20° C., preferably 25° C. However, optionally, an auxiliary thickener (which may be a single component or combination of components) may also be included. If a thickener is used according to the second aspect of the invention such thickener is preferably not radiation curable.

In the case of the vehicles according to the first aspect of the present invention, the amount of the radiation curable material is preferably from 35% to 98%, more preferably from 50% to 95%, still more preferably from 60% to 92% by weight of the vehicle. The thickener preferably constitutes from 0.5% to 30%, more preferably from 3% to 10% by weight of the vehicle.

In the case of vehicles according to the second aspect of the present invention, the amount of the radiation curable material is preferably from 5% to 50% by weight of the vehicle. The thickener then preferably constitutes from 0.1% to 10%, more preferably from 1% to 5% by weight of the vehicle.

In the case of vehicles according to the second aspect of the present invention, an auxiliary thickener may optionally be included. An auxiliary radiation curable component may also be included which may or may not meet the viscosity requirement of the main radiation curable material, as desired. In other words, this auxiliary radiation curable material may in itself be radiation curable and/or at least capable of involvement in curing of the main radiation curable material (e.g. by acting as a cross-linking agent).

Materials suitable for use as radiation curable materials in the first aspect of the invention or auxiliary radiation curable components in the second aspect of the invention fall into two categories.

The first category comprises those materials which are curable (i.e. at least capable of involvement in a curing reaction) in the presence of a free radical initiator. The second category comprises those which are curable in the presence of a cationic initiator. The second category is mainly applicable to the first aspect of the present invention.

The amount of photoinitiator will normally be from 1%, to 15%, preferably from 1% to 10% by weight of the total composition. A wide spectrum of photoinitiators is commercially available and a non-exhaustive selection of appropriate types include xanthone or thioxanthone types, benzophenone types, quinone types and phosphine oxide types.

functional unsaturation and must be used in conjunction with separate cross-linking agents in order to allow polymerisation upon curing.

One class of suitable difunctional materials are difunctional acrylates (e.g. difunctional diacrylates) such as a difunctional cycloaliphatic acrylate, for example a difunctional cyclohexane acrylate. A specific material of the latter kind is cyclohexane dimethanol diacrylate sold as CD406X ex Sartomer.

One class of monofunctional materials which are radiation curable and may be used in the presence of a cross-linking agent comprise a monofunctional acrylate such as an acrylate ester of a fatty alcohol or of an ethoxylated fatty alcohol. These are especially (although not exclusively) useful as radiation curable materials for vehicles according to the second aspect of the present invention. Suitable examples of such materials are the acrylate esters of Unilin (Trademark) alcohols and of the Unithox (Trademark) ethoxylates ex Petrolite Corp.

Alternatively, cationic curing materials of the second class could be used in place of or together with (so called "hybrid systems") the above mentioned materials of the first class. In these systems crosslinking takes place by an ionic rather than free radical mechanism. One common chemistry used is that of the cycloaliphatic epoxides which cure in the presence of strong cationic initiators. Onium salt photoinitiators are commonly used which undergo photolysis in the presence of uv light to form highly efficient cationic species. A general scheme might be:

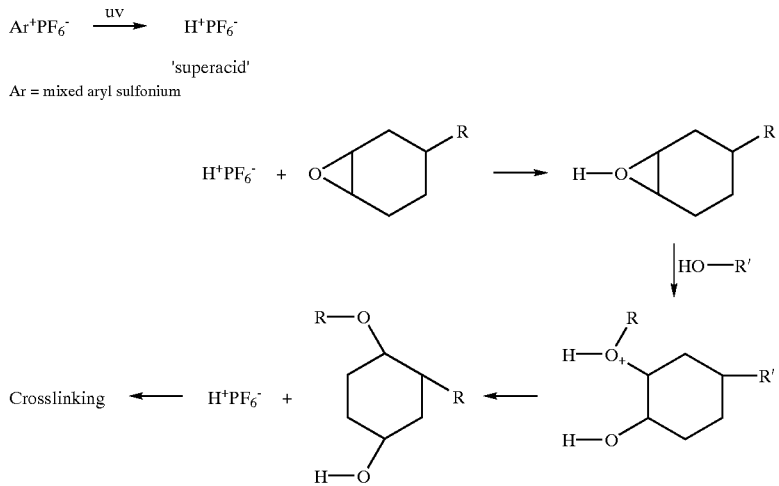

Sometimes, it is also desirable to include a co-initiator, as well as a primary photoinitiator, most preferably of the amine or aminobenzoate type. In that case, it is preferred for the total photoinitiator (primary initiator plus co-initiator) to be within the aforementioned preferred range. For example, typical co-initiators are aminobenzoate and acrylated amine co-initiators, these generally being used with the xanthone/thioxanthone types of primary photoinitiator. Suitable photoinitiator stabilisers include those disclosed in EP-A-0 465 039.

The first category (free radical polymerisable) of materials generally comprises monomers and oligomers having a degree of ethylenic unsaturation, e.g. the (meth)acrylates but preferably they comprise materials having difunctional unsaturated moieties (e.g. vinyl groups) or else have mono- Where a radiation curable material (either as primary curable material or as all or part of the thickener) needs the presence of a cross-linking agent to make it sufficiently curable, such crosslinking agent may for example be selected from multifunctional acrylates (for free radical curing systems) and multifunctional epoxides and/or polyols (for cationic curing systems).

Radiation curing, in the context of the present invention means a polymerisation reaction effected by application of any suitable radiation such as electron beam radiation or any appropriate electromagnetic radiation such as in the ultraviolet (UV) spectrum. However, many radiation curable components require the presence of a photoinitiator.

Many suitable materials which are not radiation-curable and may be used as (non-curable) thickeners in the first aspect of the present invention or auxiliary thickeners in the second aspect of the invention are polymeric substances which are hard at room temperature but which become liquid at elevated temperatures. Such materials are preferably also film-forming polymers at room temperature, e.g. styrene polymers or copolymers, hydrocarbon resins, phenolic resins and fatty acid amides.

Other materials usable as non-curable thickeners are the urethane oligomers described in PCT Patent Specification No. WO 94114902. These oligomers are the reaction products of diisocyanates with a monohydric alcohol component, optionally followed by another monohydric component or a dihydric alcohol component followed by a monohydric alcohol component. Another class of suitable such material comprises the urethane- and urea-amides disclosed in our unpublished UK patent application no. 9519646.5. These materials are the reaction products of a mono- or di-isocyanate with one or more functional amides. They typically have molecular weights in the range from 800–1400.

Yet other materials which may typically be used as non-curable thickeners are waxes, typical examples being stearone, carnauba wax, stearyl stearamide, hydrogenated castor oil, erucamide, acid waxes (e.g. Wax S ex Hoechst), ester waxes (e.g. Wax E ex Hoechst, Syncrowax ERLC $C_{18}$–$C_{36}$ ester glycol esters, Syncrowax HGLC $C_{18}$–$C_{36}$ acid triglyceride ex Croda).

When used in an ink-jet ink, generally the vehicle as a whole will make up 50–98% by weight, especially 75–95% by weight of the composition, optionally with one or more optional additives for example, antioxidants, surfactants, levelling additives, photoinitiator stabilisers, wetting agents and pigment stabilisers.

Suitable surfactants are preferably of non-ionic type, for example Fluorad FC430 (ex 3M Corp.). Such surfactants (when present) are preferably included in an amount of from 0.1% to 10% by weight of the total composition.

Hot melt inks can basically be considered to consist of the vehicle plus a colourant optionally with any minor ingredients such as hereinbefore described. The present invention extends to compositions according to the present invention which function as hot melt ink vehicles and those which comprise such a composition according to the present invention together with a colourant, or else otherwise coloured as described hereinbelow.

Broadly speaking, colourants may be considered as falling into two classes, namely dyes, which are substantially soluble in the ink composition, and pigments, which are dispersed in the ink composition in the form of fine particles, if necessary with the aid of a suitable dispersant. The term "colourant" includes materials which endow a non-visible optical property (e.g. fluorescence) to the ink.

Where dyes are employed, these may be selected from a wide range of classes, so long as they are soluble in the ink vehicle. A non-exhaustive list of dyes includes those of the Orasol range ex CIBA and the Savinyl range ex Hoechst. Respectively, typical examples are Orasol blue GN, Yellow 4GN; Savinyl Black RLS and Red GLS.

Pigments may be selected from a wide range of classes, for example, Pigment Red 57:1, Pigment Red 52:2, Pigment Red 48:2, Pigment Blue 15:3, Pigment Green 7, Pigment Yellow 83, Pigment Yellow 13, Pigment White 6, Pigment Black 7. A non-exhaustive list of examples of such pigments include the following from the Irgalite range ex CIBA: Rubine L4, Bordeaux CM, Red 2BP, Blue LG, Green GLN, Yellow B3R and yellow LBG; as well as Tioxide RHD6 (ex Tioxide) and Special Black 250 (ex Degussa).

Where the colourant is a pigment, then unless the pigment is self-dispersing, it is necessary to incorporate a dispersant therefor. Suitable dispersants typically include polyester, polyurethane or polyacrylate types, especially in the form of high molecular weight block co-polymers, and would typically be incorporated at from 2.5% to 150% by weight of the pigment. Suitable examples are Disperbyk 161 or 162 (ex BYK Chemie) or Solsperse ex Zeneca.

Another way of introducing a colour (or other optical property) is to incorporate an ingredient which itself endows the property, e.g. a polymer or oligomer having a dye moiety bonded onto or incorporated therein. Suitable materials are disclosed in GB-A-2 038 849, U.S. Pat. No. 5,264,507, U.S. Pat. No. 15,098,475, EP-A-540 248 and our unpublished UK patent application no. 9520470.7.

Preferably the vehicles according to either, or both, of the first and second aspect comprise one or more radiation curable materials which are coloured.

The present invention will now be explained in more detail by way of the following description of non-limiting examples.

| Example | 1 | 2 | 3 | 4 | 5 | 6 | 7 | 8 |
|---|---|---|---|---|---|---|---|---|
| Form | Solid | Solid | Paste | Paste | Paste | Paste | Paste | Paste |
| Viscosity @ 25° C.(20 s$^{-1}$) | Solid | Solid | 1000 cps | 1100 cps | 1400 cps | 1300 cps | 1200 cps | 1000 cps |
| Viscosity @ 25° C.(1000 s$^{-1}$) | Solid | Solid | ~110 cps | 190 cps | ~120 cps | ~120 cps | ~110 cps | ~110 cps |
| Viscosity @ 90° C.(1000 s$^{-1}$) | 5.2 | 5.8 | 4.1 | 14 cps | 4.0 | 13.0 | 17.0 | 15.0 |
| Formulation | | | | | | | | |
| Acrylate ester of Unilin 425 Alcohol wax X 8505 (1) | 21.0 | 40.0 | 5.0 | 5.0 | — | — | — | — |
| Unilin 350 (1) | | | | | 6.0 | — | 2.0 | 3.0 |
| Syncrowax ERLC (4) | | | | | | 5.5 | 3.0 | 3.0 |
| Cyclohexane dimethanol diacrylate | — | 44.8 | — | — | — | — | — | — |
| Dipenta erythritol Pentaacrylate (2) SR 399 | — | — | — | 10.0 | — | — | — | 5.0 |
| Ethoxylated neopentyl glycol diacrylate | 64.2 | — | 79.8 | 64.3 | 85.6 | — | 30.0 | — |
| Isobornyl acrylate | — | — | — | — | — | 21.0 | 10.0 | 30.0 |

-continued

| Example | 1 | 2 | 3 | 4 | 5 | 6 | 7 | 8 |
|---|---|---|---|---|---|---|---|---|
| Form | Solid | Solid | Paste | Paste | Paste | Paste | Paste | Paste |
| Ethoxylated trimethylopropane triacrylate | — | — | — | — | 1.5 | 38.2 | 37.3 | 24.0 |
| 1,4 butanedrol diacrylate | — | — | — | — | — | 20.3 | — | 20.0 |
| Acrylate Amine CN384 (2) | — | — | — | — | — | 5.0 | 5.0 | — |
| Isopropyl thioxanthone | 2.1 | 2.5 | 2.5 | 7.5 | 1.7 | 1.5 | 2.5 | 1.8 |
| 4-phenyl benzophenone | 1.0 | 1.0 | 1.0 | 3.0 | 2.0 | 1.5 | 1.0 | 2.0 |
| 2-benzyl-2-dimethylamine-1-(4-morpholinophenyl)butan-1-one | 1.0 | 1.0 | 1.0 | 3.0 | 1.0 | 0.8 | 1.0 | 1.0 |
| (2-ethyl)hexyl 4-dimethylamino benzoate | 3.0 | 3.0 | 3.0 | — | 2.0 | — | — | 2.0 |
| Fluorosurfactant (Fluorad FC430 (3) | 0.2 | 0.2 | 0.2 | 0.2 | 0.2 | 0.2 | 0.2 | 0.2 |
| Carbon black Pigment/Dispersant | 7.5 | 7.5 | 7.5 | 7.0 | — | — | — | — |
| Pigment Blue 15:3/Dispersant | — | — | — | — | — | 6.0 | — | — |
| Pigment Red 122/Dispersant | — | — | — | — | — | — | 8.0 | 8.0 |
| Total | | | | | 100% | | | |

(1) = ex Petrolite Corporation
(2) = ex Sartomer
(3) = ex 3M
(4) = ex Croda

| Example | 9 | 10 |
|---|---|---|
| Form | Paste | Paste |
| Viscosity @ 25° C. (20s$^{-1}$) | ~3200 cps | ~3900 cps |
| Viscosity @ 25° C. (1000s$^{-1}$) | ~130 cps | ~160 cps |
| Viscosity @ 80° C. (1000s$^{-1}$) | ~16.3 cps | ~14.0 cps |
| CYRACURE UVR 6105 (1) (3,4,Epoxy cyclohexyl methyl-3,4-epoxy cyclohexane carboxylate) | 78.8 | 73.8 |
| CYRACURE UV1 6900 (1) (Mixed triaryl sulfonium Hexafluorophosphate salt) | 6.0 | 6.0 |
| Rapicure HBVE (4-hydroxybutyl vinyl ether) | 10.0 | 15.0 |
| Hoechst Wax E (2) | 5.0 | — |
| Unilin 425 (3) | — | 5.0 |
| Fluorosurfactant (Fluorad FC 430) (4) | 0.2 | 0.2 |
| Total % = | 100 | 100 |

(1) ex Union Carbide
(2) ex Hoechst
(3) ex Petrolite
(4) ex 3M

In the light of this disclosure, modification of the described examples, as well as other examples, all within the scope of the present invention as defined by the appended claims will now become apparent to persons skilled in the art.

What is claimed is:

1. An ink-jet ink comprising an ink jet vehicle and a colourant, the vehicle comprising at least 35% by weight, based on the total vehicle weight, of a radiation curable material and further comprising a thickener, said vehicle being a thixotropic paste at 20° C., and said vehicle having a viscosity of less than 25 centipoise at least one temperature in the range of from 40° C. to 130° C.

2. An ink-jet ink according to claim 1, wherein the thickener is not radiation curable.

3. An ink-jet ink according to claim 1, wherein the thickener is present at from 0.5% to 30% by weight of the vehicle.

4. An ink-jet ink according to claim 1, comprising from 35% to 98% by weight of the radiation curable material.

5. An ink-jet ink according to claim 1, wherein the radiation curable material is curable by a free radical initiator.

6. An ink-jet ink according to claim 5, wherein the radiation curable material comprises at least one of an ethylenically unsaturated monomer and ethylenically unsaturated oligomer.

7. An ink-jet ink according to claim 5, wherein the radiation curable material comprises a monofunctional acrylate.

8. An ink-jet ink according to claim 7, which further comprises a cross-linking agent.

9. An ink-jet ink according to claim 5, wherein the radiation curable material comprises a difunctional acrylate.

10. An ink-jet ink according to claim 9, wherein the difunctional acrylate is a difunctional cycloaliphatic acrylate.

11. An ink-jet ink according to claim 5, further comprising a photoinitiator.

12. An ink-jet ink according to claim 1, wherein the radiation curable material is curable in the presence of a cationic initiator.

13. An ink-jet ink according to claim 12, further comprising a cationic initiator.

14. An ink-jet ink according to claim 1, which comprises as a colourant at least one radiation curable material having a dye moiety bonded onto it or incorporated therein.

15. An ink jet ink according to claim 1, which is a thixotropic paste at 25° C.

16. An ink-jet ink according to claim 1, which has a viscosity of less than 12 centipoise at at least one temperature in the range of from 40° C. to 130° C.

17. An ink-jet ink according to claim 1, wherein the thickener is present at from 2 to 10% by weight of the vehicle.

18. An ink-jet ink according to claim 1, comprising from 60% to 95% by weight of the radiation curable material.

19. An ink-jet ink according to claim 1, comprising from 60% to 92% by weight of the radiation curable material.

20. An ink-jet ink according to claim 1, wherein the radiation curable material comprises at least one of the following: an acrylate monomer, a methacrylate monomer, an acrylate oligomer, and a methacrylate oligomer.

21. An ink-jet ink according to claim 1, wherein said colourant comprises at least one of a dye and a pigment.

22. An ink-jet ink comprising a colourant in admixture with a vehicle, the vehicle comprising a first radiation curable material, which first radiation curable material is a radiation curable wax that is a paste or a solid at 20° C., and a second radiation curable material, the vehicle having a viscosity of less than 25 centipoise at least one temperature in the range of from 40° C. to 130° C.

23. An ink according to claim 22, further comprising a thickener.

24. An ink according to claim 23, wherein the thickener is not radiation curable.

25. An ink according to claim 24, wherein the thickener is present at 0.1% to 10% by weight of the vehicle.

26. An ink according to claim 25, wherein the thickener is present at from 1 to 5% by weight of the vehicle.

27. An ink according to claim 22, wherein the second radiation curable material is curable by a free radical initiator.

28. An ink according to claim 22, wherein the second radiation curable material is curable by a cationic initiator.

29. An ink according to claim 22, in which the vehicle comprises from 5% to 50% by weight of the first radiation curable material.

30. An ink according to claim 27, wherein the first radiation curable material comprises a monofunctional acrylate-modified wax.

31. An ink according to claim 30, wherein the monofunctional acrylate-modified wax is an acrylate ester of at least one of a fatty alcohol and of an ethoxylated fatty alcohol.

32. An ink according to claim 30, further comprising a cross-linking agent.

33. An ink according to claim 22, further comprising a photoinitiator.

34. An ink according to claim 22, which comprises at least one radiation curable material having a dye moiety bonded on to it or incorporated therein.

35. An ink according to claim 22, in which the first radiation curable material is a paste or a solid at 25° C.

36. An ink according to claim 22, in which the radiation curable material has a viscosity of less than 12 centipoise at least one temperature in the range of from 40° C. to 130° C.

37. An ink-jet ink according to claim 22, wherein said colourant comprises at least one of a dye and a pigment.

* * * * *